United States Patent [19]
Morrill

[11] Patent Number: 6,089,321
[45] Date of Patent: Jul. 18, 2000

[54] PRESSURE BALANCED CHOKE AND KILL LINE CONNECTOR

[75] Inventor: Charles D. Morrill, Humble, Tex.

[73] Assignee: Hydril Company, Houston, Tex.

[21] Appl. No.: 09/039,984

[22] Filed: Mar. 16, 1998

[51] Int. Cl.[7] .................................................. E21B 7/12
[52] U.S. Cl. ...................... 166/341; 166/338; 166/344; 166/368
[58] Field of Search ..................... 405/224; 166/338, 166/344, 345, 368, 363

[56] References Cited

U.S. PATENT DOCUMENTS

| | | | |
|---|---|---|---|
| 3,321,217 | 5/1967 | Ahlstone ............................. | 166/338 X |
| 3,325,190 | 6/1967 | Eckert et al. ....................... | 166/344 X |
| 3,330,341 | 7/1967 | Jackson et al. .................. | 166/75.14 X |
| 3,746,372 | 7/1973 | Hynes et al. . | |
| 3,870,345 | 3/1975 | Liautaud ............................. | 166/338 X |
| 4,478,287 | 10/1984 | Hynes et al. ....................... | 166/345 X |
| 4,589,493 | 5/1986 | Kelly et al. ........................ | 166/344 X |
| 4,593,937 | 6/1986 | Schawann et al. ................. | 166/339 X |
| 4,647,254 | 3/1987 | Baugh et al. ....................... | 166/345 X |
| 4,668,126 | 5/1987 | Burton . | |
| 4,823,878 | 4/1989 | Brammer et al. ................... | 166/345 X |
| 4,987,956 | 1/1991 | Hansen et al. .......................... | 166/361 |
| 5,634,671 | 6/1997 | Watkins ................................... | 285/18 |

FOREIGN PATENT DOCUMENTS

WO 91/19926  12/1991  WIPO .

OTHER PUBLICATIONS

Cameron Product Catalog, "Subsea Drilling Systems", date unknown, p. 365, Houston, TX.
Cameron Composite Catalog of Oil Field Equipment and Services, "Collet Connectors", 1996–97, pp. 379–380, Houston, TX.
Cameron Schematic, "Choke and Kill Line Collet Connector", date unknown, pp. 1–15–1–19.
Coflexip Stena Offshore Group, "Drilling and Service Applications", date unknown, p. 544.
FMC Fluid Control Division, "Dynetor Connectors", date unknown, p. 6.
Illustrated Petroleum Reference Dictionary, 4th Ed., 1994, p. 237.
Hydril Drawing #3106486, "Choke and Kill Stub Assy—Lower Marine Riser", Sep. 23, 1985.
PCT/US99/05152; International Search Report; Jun. 28, 1999.

*Primary Examiner*—Dennis L. Taylor
*Attorney, Agent, or Firm*—Rosenthal & Osha L.L.P.

[57] ABSTRACT

A pressure balanced connector is provided for connecting a choke and kill line to a subsea wellhead. The connector bears the separation forces applied by the line pressure with a pressure balancing chamber that is in constant fluid communication with the choke and kill line. The forces applied on the pressure balancing chamber hold a latching mechanism for the connector in place on the wellhead. The latching mechanism does not require precise positioning with the wellhead to make the connection.

6 Claims, 9 Drawing Sheets

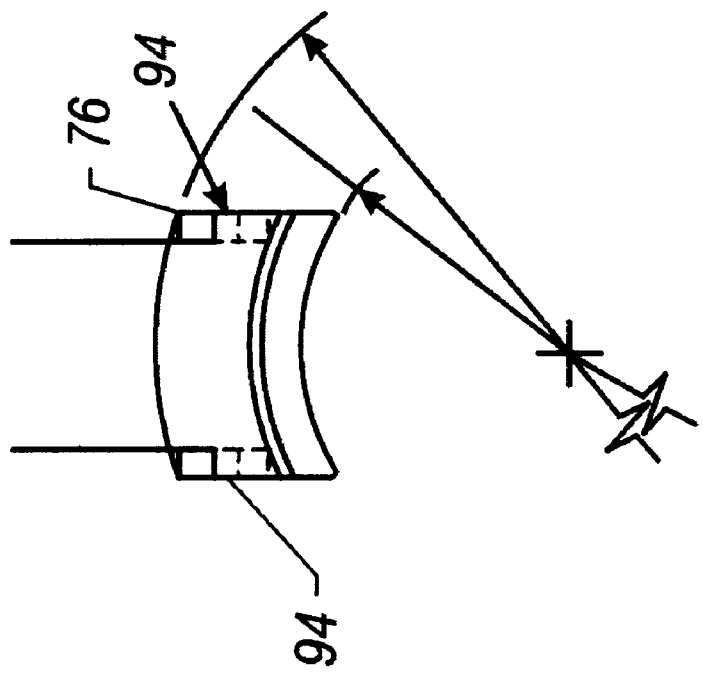
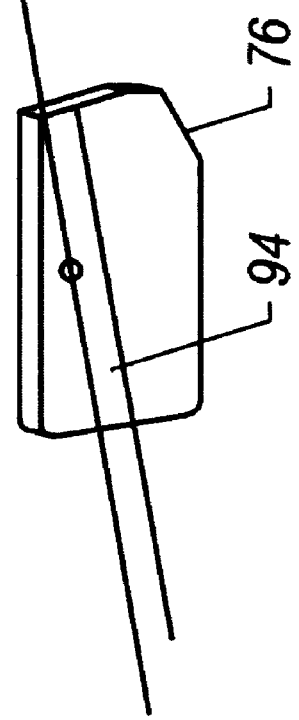
FIG. 4C
FIG. 4B

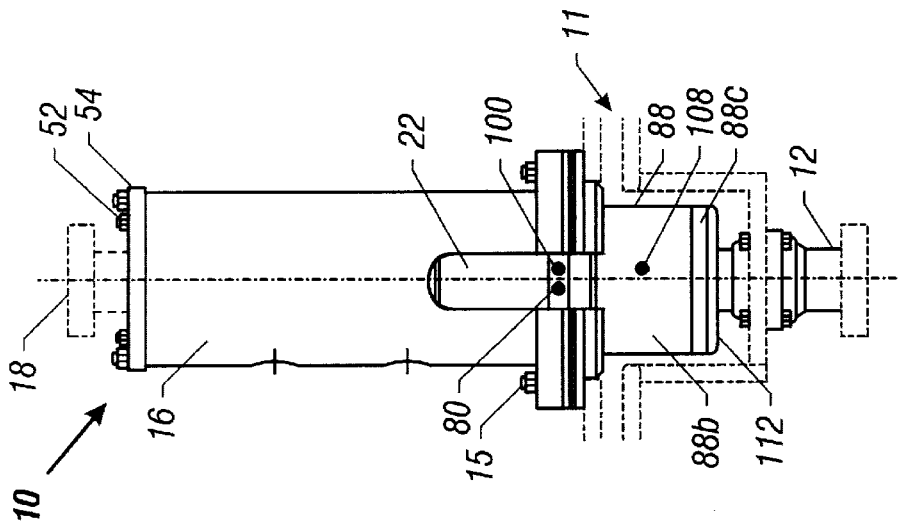
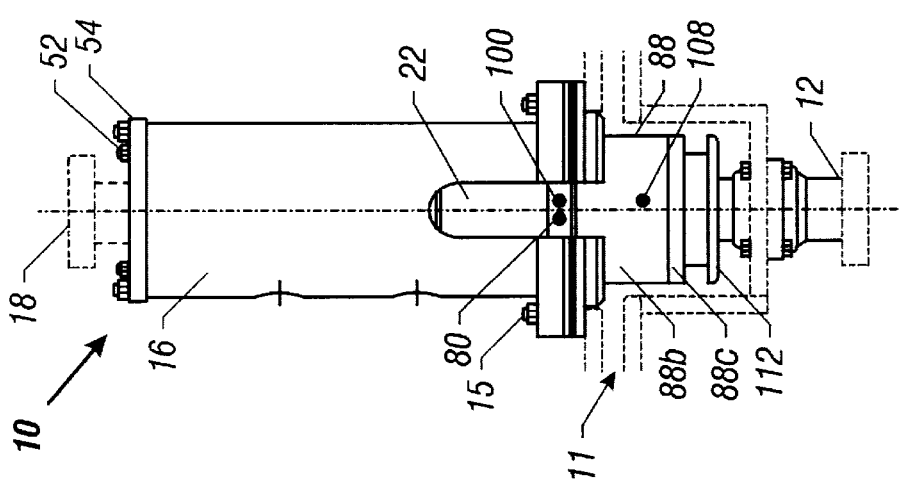
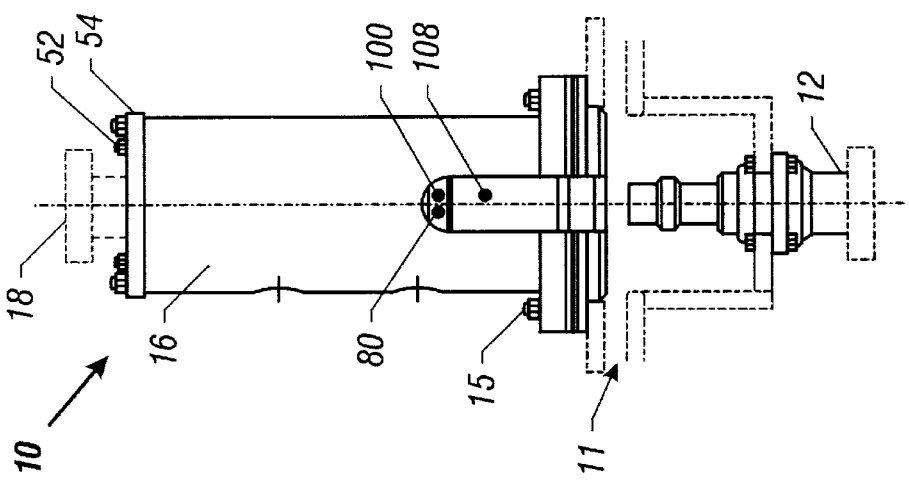

PRESSURE BALANCED CHOKE AND KILL LINE CONNECTOR

FIELD OF INVENTION

The present invention relates to a choke and kill line connector for connecting a choke and kill line to a blowout preventer (BOP) stack on a wellhead.

BACKGROUND OF THE INVENTION

A blowout preventer (BOP) is used to seal off a wellhead during drilling operations when the drill pipe experiences a "kick" or sudden increase in downhole pressure which threatens a blowout. The BOP functions by closing the annulus or gap between the interior drill pipe and the exterior surface pipe. Once the wellhead has been sealed, the downhole pressure must be overcome before drilling operations can resume.

A choke and kill line is used to circulate drilling mud to the wellhead. The drilling mud is "heavied" with clays which gives it a higher density so as to overcome the pressure. The higher density mud displaces the lower density mud in the line which is usually "gas cut" or aerated with gas from the downhole formation. In one arrangement, the drilling mud is pumped through the choke and kill line into the annulus between the surface casing and the well bore casing. The mud is displaced through the annulus and retrieved at the surface. This requires a connection between the annulus and the surface. Alternately, the higher density mud could be pumped through the annulus and retrieved through the choke and kill line. Further arrangements, use a separate choke line and a kill line. The mud is pumped through the kill line and returned through the choke line, bypassing the closed valves of the BOP.

Irrespective of the number of or types of choke and kill lines used, the fluids flowing through a choke and kill line are at relatively high pressures in order to overcome the downhole pressure. This high pressure imparts great separation forces to the connector between the choke and kill line and the wellhead. In order to keep the line in place, these forces are typically borne by a massive structure such as the one that supports the BOP stack.

SUMMARY

The invention relates to an apparatus for connecting a choke and kill line to a wellhead comprising: a body which communicates the fluid from the choke and kill line through a bore to an existing stab member of a subsea wellhead comprising two hydraulically activated pistons which extend and retract a latching mechanism; a hydraulically activated and de-activated latching mechanism, which connects the body to the stab member without requiring precise positioning between the latching mechanism and the stab member, comprising: a primary locking piston, a primary locking port, a primary locking bore, a primary unlocking port, a secondary unlocking port, a primary unlocking bore, and a secondary unlocking bore; and a pressure balancing mechanism which holds the latching mechanism in place against the stab member comprising: a pressure balancing chamber in constant fluid communication with the bore of the body; and four ports which connect the pressure balancing chamber to the bore of the body.

In an alternative embodiment, the invention relates to an apparatus for connecting a choke and kill line to a wellhead comprising: means for communicating the fluid from a choke and kill line through a body to an existing stab member of a wellhead, means for latching the body to the stab member, and means for balancing the pressure exerted on the body and the stab member.

In an alternative embodiment, the invention relates to a method for connecting a choke and kill line to a subsea wellhead comprising: positioning a body comprising two hydraulically activated pistons and a bore, to communicate fluid from a choke and kill valve line through the bore to an existing stab member of a wellhead; hydraulically activating a latching mechanism to connect the body to the stab member, which does not require precise positioning between the latching mechanism and the stab member, comprising: a primary locking piston, a primary locking port, a primary locking bore, a primary unlocking port, a secondary unlocking port, a primary unlocking bore, and a secondary unlocking bore; and pressurizing a pressure balancing mechanism, which comprises a pressure balancing chamber in constant fluid communication with the bore of the body and four ports which connect the pressure balancing chamber and the bore of the body, which holds the latching mechanism in place against the stab member.

BRIEF DESCRIPTION OF THE DRAWINGS

Like reference numbers and description in the drawings indicate like elements.

FIGS. 4A, 4B and 4C show detailed sections of components of the latch shown in FIG. 4.

FIGS. 7A, 7B, and 7C are perspective view that show how the present invention indicates externally when it is set in a retracted unlocked, an extended unlocked, and an extended locked position, respectively.

DETAILED DESCRIPTION

The details of one or more embodiments of the invention are set forth in the accompanying drawings and description below. Other features, objects and advantages of the invention will be apparent from the drawings, description and claims.

Figure 1A:
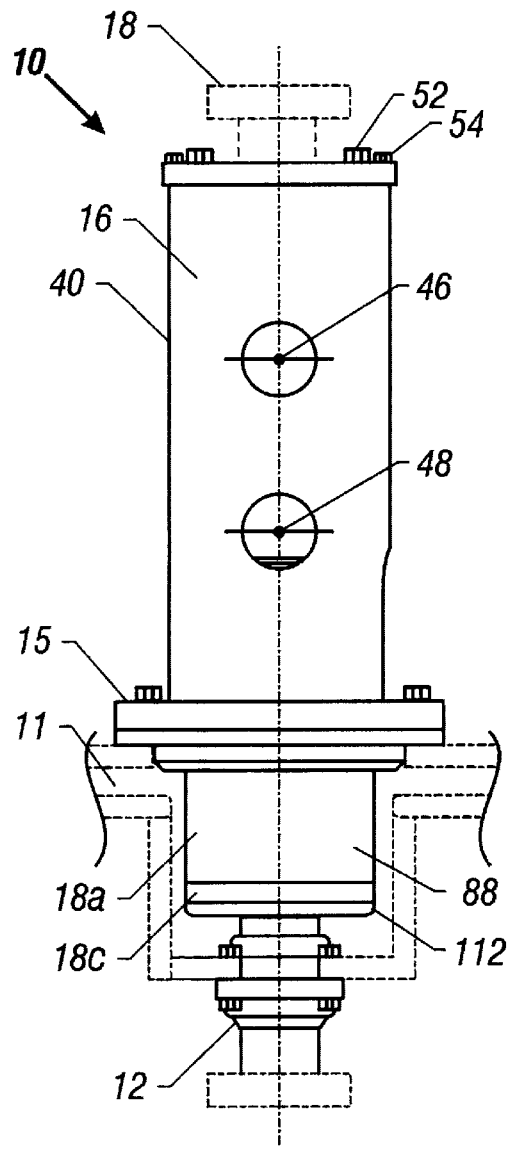
FIGS. 1A and 1B are two perspective views of the choke and kill connector that are rotated 90° with respect to each other.
Figure 1B:
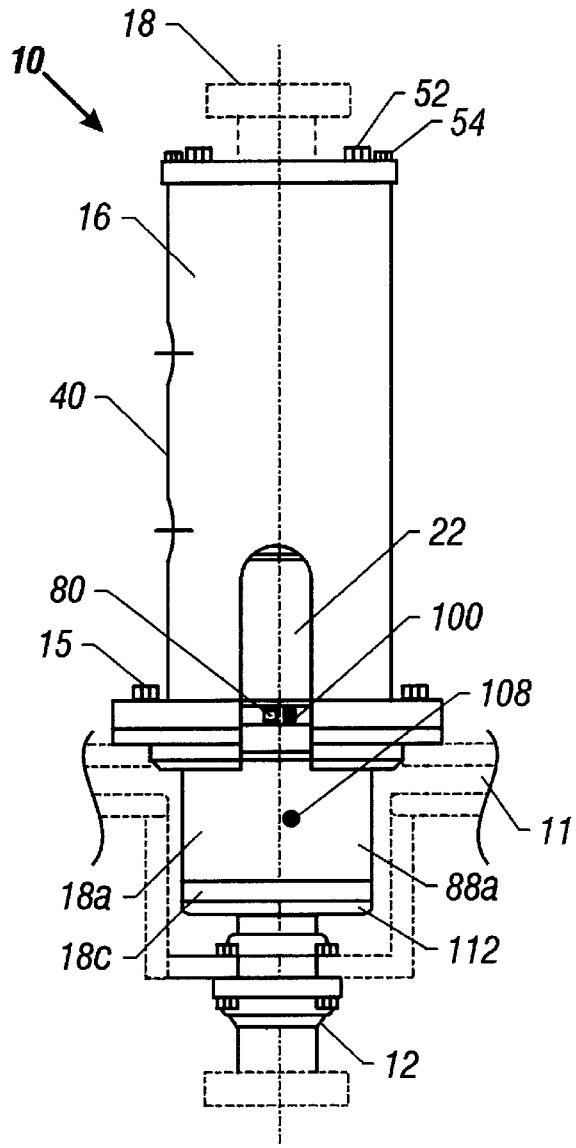

FIGS. 1A and 1B show two views of a choke and kill line connector 10. The connector 10 is shown with a connecting flange 18 which attaches the choke and kill line to the connector 10 and a stab member 12 which attaches the connector 10 to the wellhead. FIG. 1A shows a hydraulic extension port 46 and a retraction port 48 which extends and retracts the primary locking piston 88. FIG. 1B shows the connector 10 in a position that is rotated 90° from the view in FIG. 1A. This view shows the latching port 80, the primary unlocking port 100, and the secondary unlocking port 108.

Figure 2:
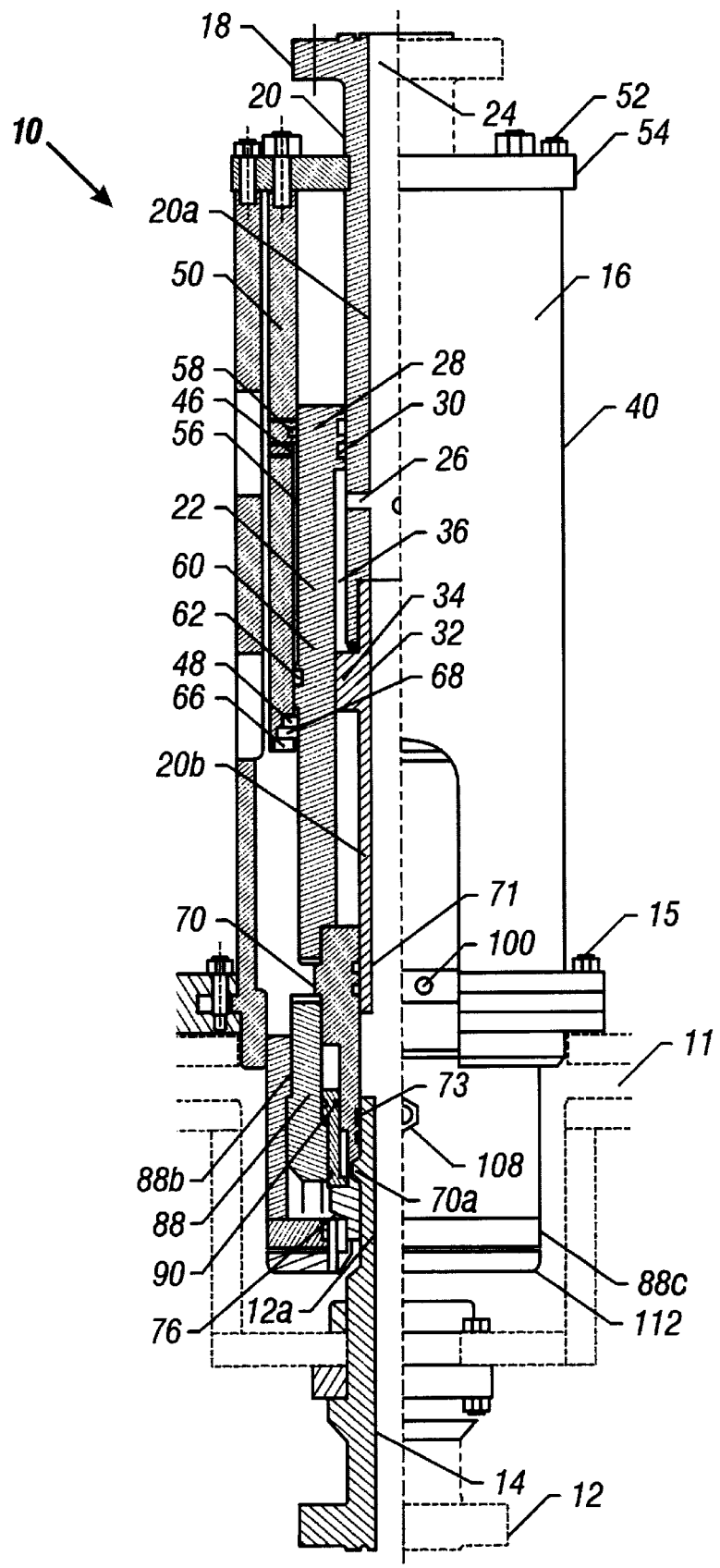
FIG. 2 is a partial perspective view and partial cross-section view of the choke and kill line connector connected to a stab member mounted on a BOP stack.
Figure 3A:
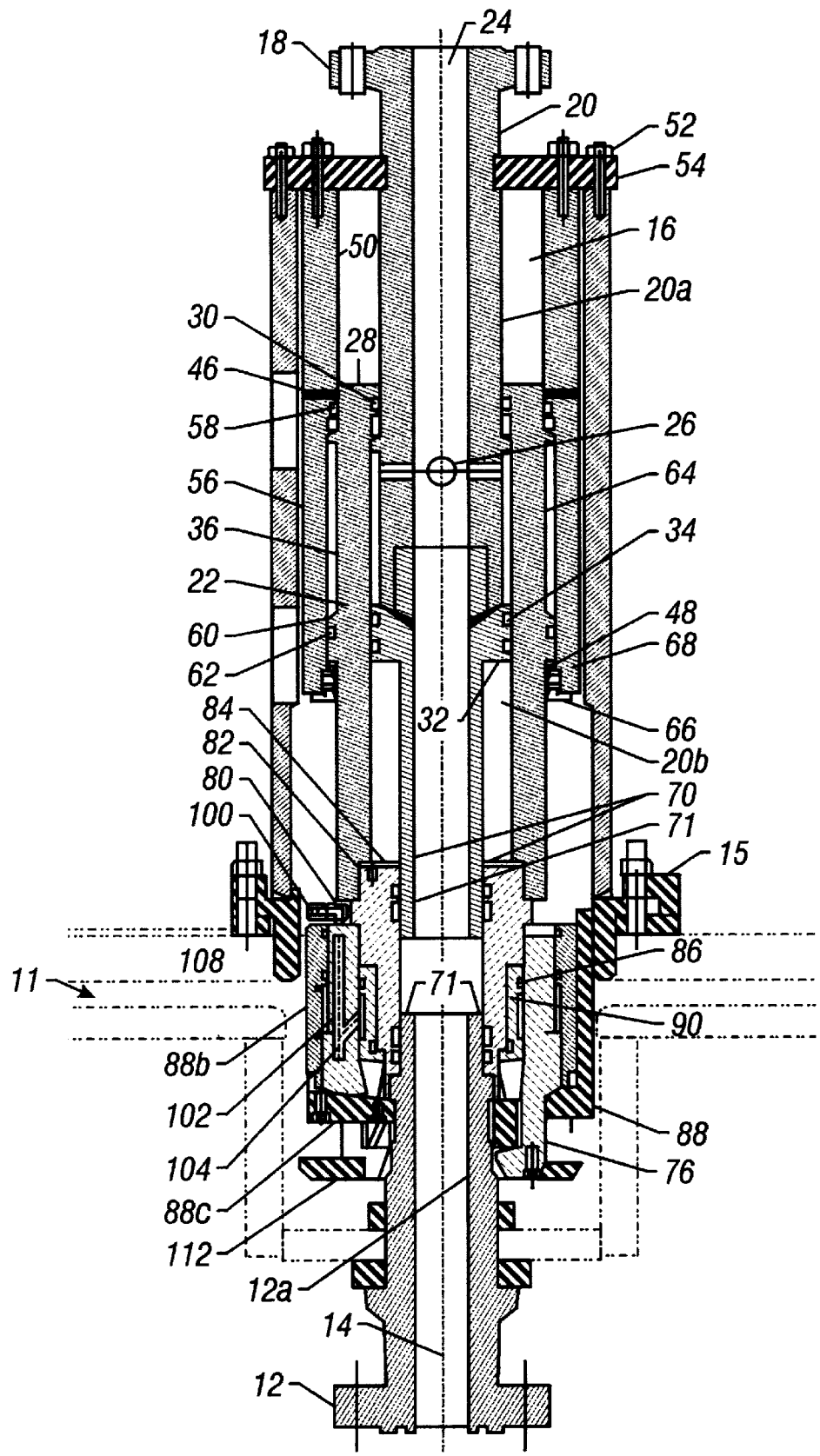
FIG. 3A shows a cross section of the connector in an extended, locked position.
Figure 3B:
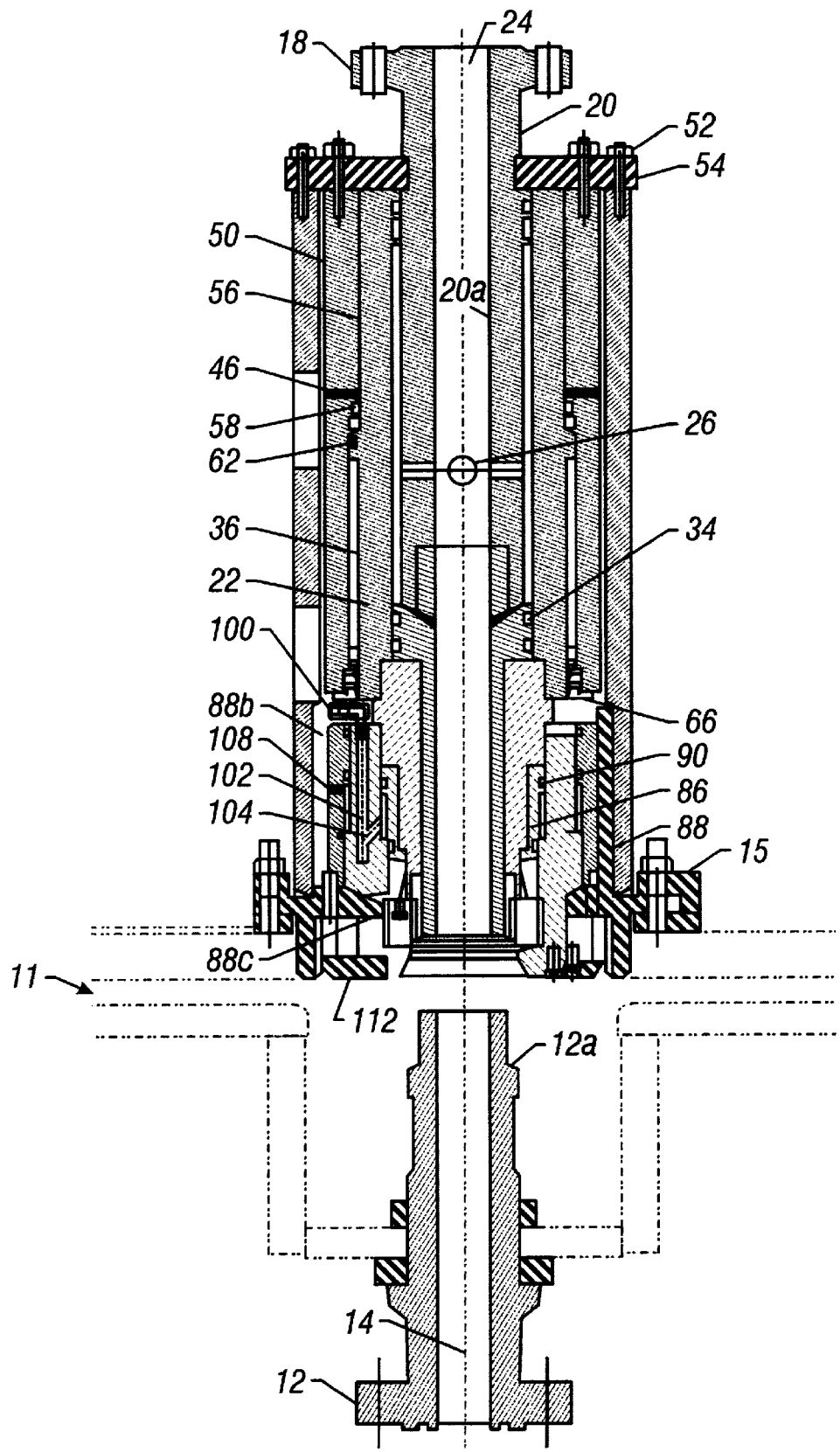
FIG. 3B shows a cross section of the connector in a retracted, unlocked position.

FIGS. 2, 3A and 3B illustrate the pressure balanced choke and kill line connector 10 of this invention connected to a stab member 12 mounted on a subsea BOP stack. The connector is usually lowered in position to be connected to the stab member by a marine riser package that includes a blowout preventer (BOP). The stab member 12 is mounted on the BOP stack (not shown) with its bore 14 in fluid communication with the well bore. High density drilling mud can be pumped into the well bore through the connector and stab member or fluid produced by the well can flow upwardly through the stab member and connector to the surface through a choke in a well-known manner.

The connector 10 includes a housing member 16 mounted on the lower marine riser package (LMRP) 11 with a mounting assembly 15 and connecting flange 18 which is connected to the choke and kill line. The housing member 16 includes several components such as a central body 20, a main piston 22, and a latching system which is described in detail below.

The bore 24 of the central body 20 is aligned with bore 14 of stab member 12 to conduct either high density mud into the annulus between the drill pipe and the casing or to conduct fluid from a formation penetrated by the well bore. The central body 20 includes upper central body 20a and lower central body 20b that are typically assembled by threadable engagement. The wall of the upper central body 20a is provided with at least one, but preferably four pressure balancing ports 26 for pressure balancing purposes which will be explained below.

The main piston 22 is located about a longitudinal portion of the central body 20 to allow axial movement along the body when hydraulic pressure is applied. A piston interior ledge 28 and its seals 30 and a central body exterior ledge 32 and its seals 34, define the pressure balancing chamber 36 between the piston and the body. As illustrated in FIGS. 2, 3A and 3B, pressure balancing ports 26 are positioned in the wall of the central body 20 so as to be in constant fluid communication with the pressure balancing chamber 36, notwithstanding the movement of the main piston 22.

Hydraulic pressure provides for moving the main piston 22 between its extended position, shown in FIG. 3A, and its retracted position, shown in FIG. 3B. An outer housing 40 is provided with openings for connecting hydraulic lines (not shown) to an extension port 46 and a retraction port 48 through the outer body 50. The outer body is fixed to outer housing 40 by bolts 52 and a retainer plate 54, as seen in FIGS. 1A, 1B, 2, 3A and 3B.

The extension port 46 communicates with an extension chamber 56 that is formed between the outer body seals 58 on the outer body 50 and the piston exterior ledge 60 and its seals 62 on the main piston 22. The application of hydraulic pressure through the extension port 46 forces the main piston 22 to move downward relative to the outer body 50 to an extended position until it engages the stab member 12.

Similarly, the retraction port 48 communicates with the retraction chamber 64 that is formed between the piston exterior ledge 60 and its seals 62 on the piston 22 and outwardly extending piston retaining member 66 including its seal 68. The application of hydraulic pressure through the retraction port 48 forces the main piston 22 to move upward relative to the outer member 50 to a retracted position, as shown on the right half of FIG. 3.

The main piston 22 is connected with threads 67 to the lower body 70 which is equipped with lower body seals 71 and 73, and a tapered section 70a. The lower body seals 71 maintains a sealed engagement between lower body 70 and the lower central body portion 20b of the central body 20 as the main piston 22 is extended and retracted. The lower body seals 73 engage the lower central body 20b when the main piston 22 is retracted, but the lower body seals 73 are lowered out of engagement as the main piston 22 is extended. Upon extension of the main piston 22, the tapered section of the lower body 70a guides the lower body 70 over and about the stab 12. As the tapered section 70a is lowered by the action of the piston 22, the seals 73 are moved into engagement with the upper end of stab member 12, as shown in FIG. 2 and the left half of FIG. 3. In this manner, the piston is guided into sealed engagement with the stab member 12, as its lower end is moved over and about the upper end of the stab member 12.

The lower body 70 further contains a latching system that locks the housing member 16 to stab member 12 when the main piston 22 is moved to its extended position. The latching system includes a plurality of latches 76 disposed for radial movement relative to the main piston 22. The latches 76 move between an extended, locked position and a retracted, unlocked position. Hydraulic pressure moves the latches 76 between their extended and retracted positions after housing member 16 has been lowered with the LMRP to a position above and substantially aligned with the stab member 12. Those of ordinary skill in the art will appreciate that precise vertical positioning of the box and pin members is not required.

Figure 4:
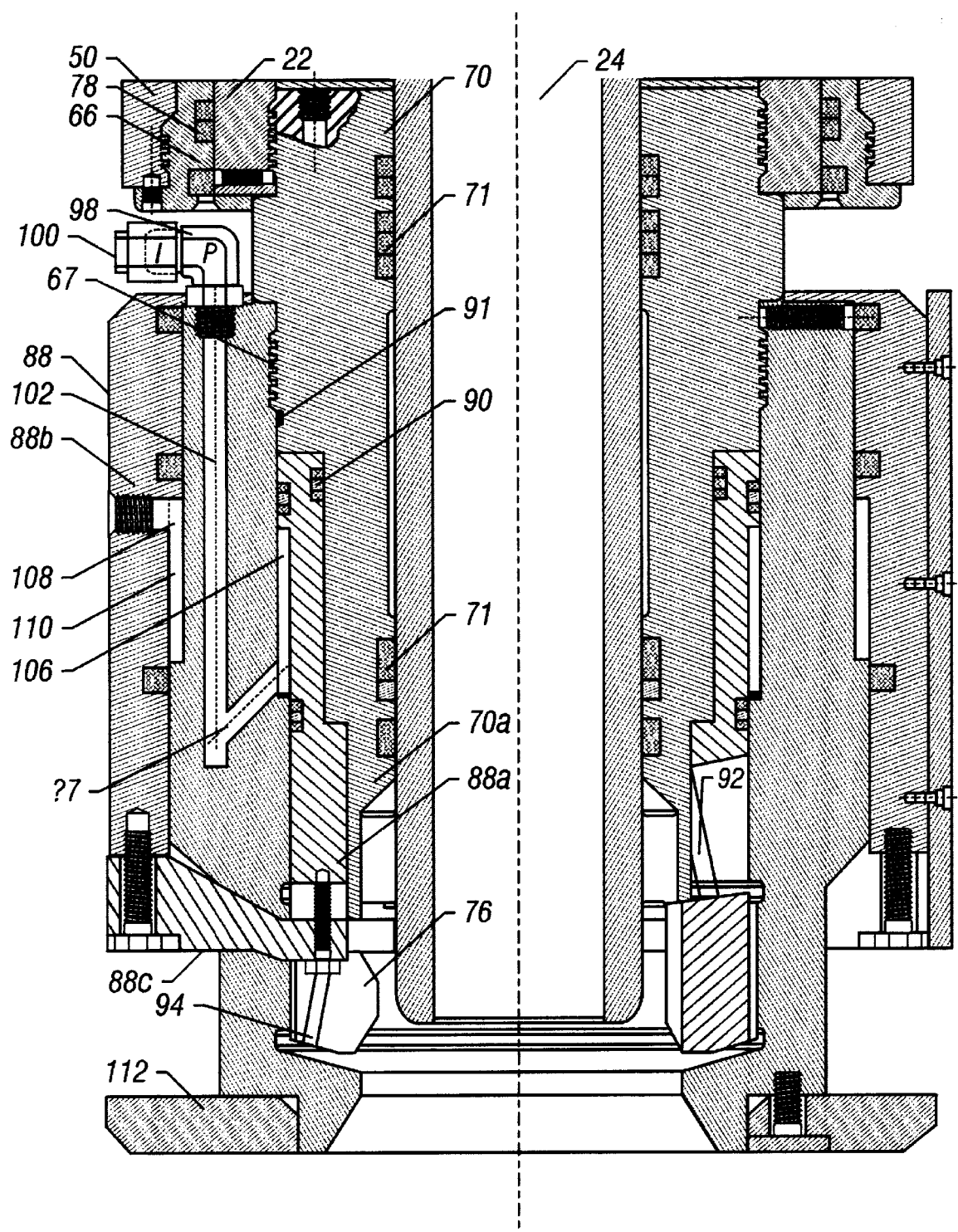
FIG. 4 is a detailed cross-sectional view of the latching system of the connector in a retracted, disengaged position.

As shown in FIGS. 3A, 3B and 4, the lower body 70 is equipped with a latching port 80 in communication with a latching bore 82. The bore is closed off at one end by plug 84 and open at the other end for communication with the latching chamber 86. The chamber is formed by secondary piston seals 90 and 91. The latching port 80 is shown positioned 90° clockwise out of position in FIGS. 3A and 3B for illustration purposes only. The proper orientation of the latching port 80 is shown in FIGS. 1B and 7A–7C. The application of pressurized hydraulic fluid through a line connected at the latching port 80 will force a primary locking piston 88 to move downward relative to outer body. The primary locking piston 88 is composed of an inner section 88a, an outer section 88b, and a lower section 88c.

Figure 4A:
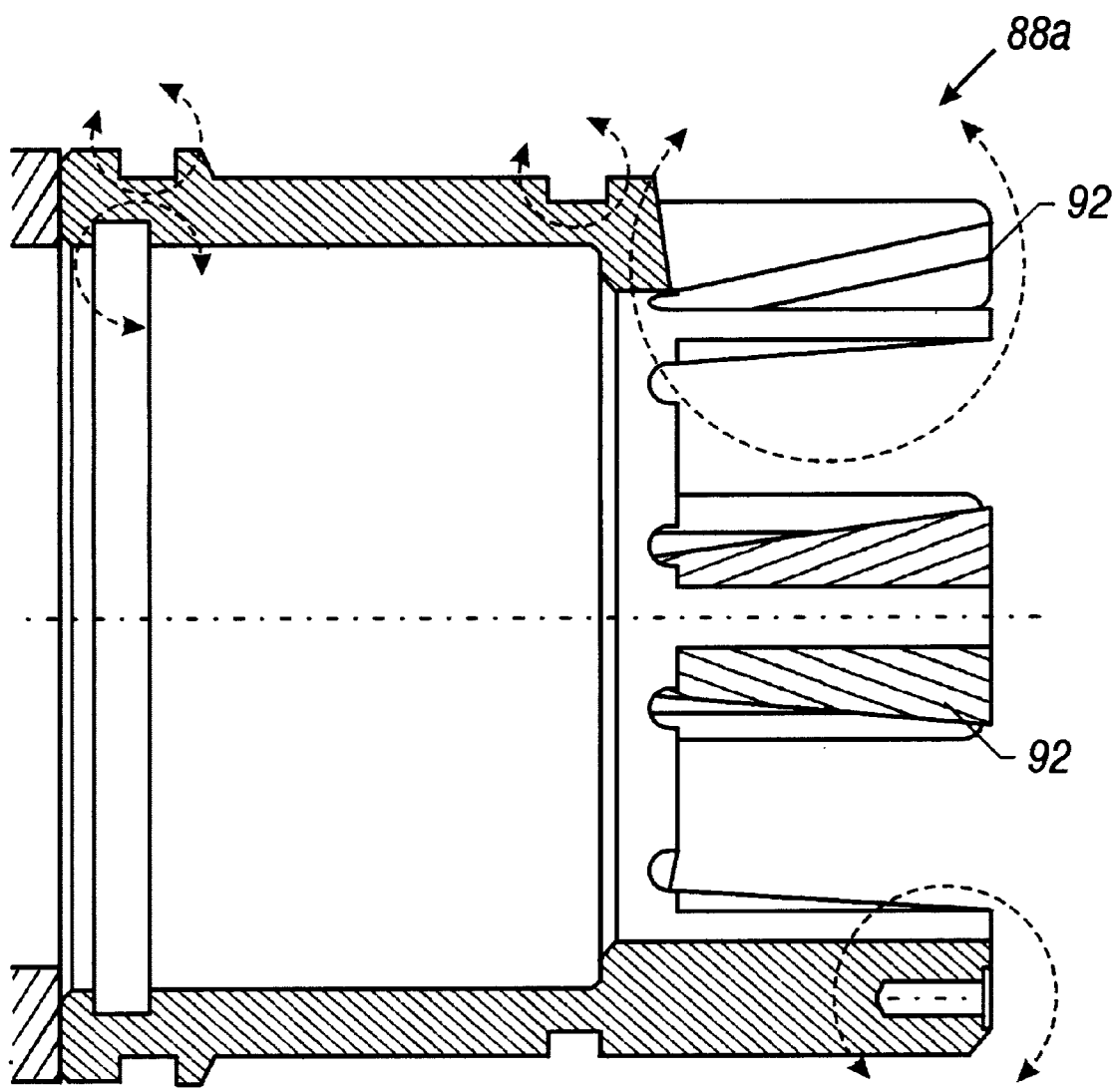
Figure 5:
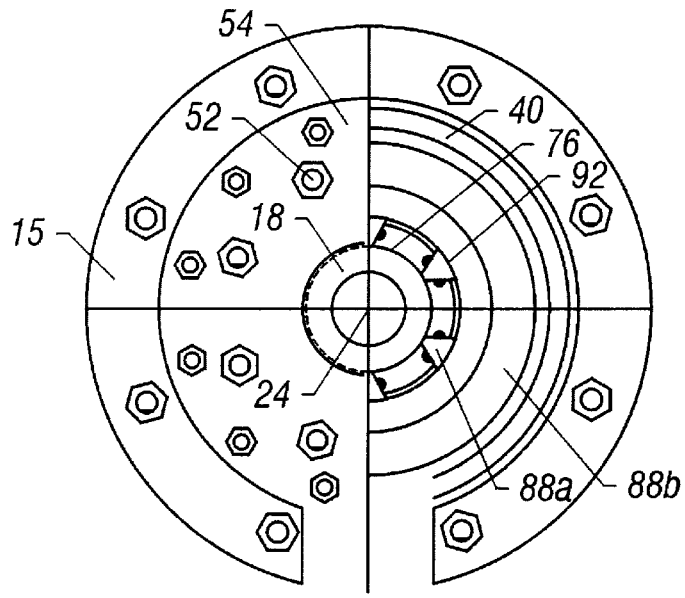
FIG. 5 is a view of the connector taken through section line A—A in FIG. 3.

As shown in FIGS. 4 and 5, the inner section of the primary locking piston 88a extends at its lower end into discrete finger-like projections having inclined ribs 92 on either side. The ribs 92 are disposed so as to be in constant engagement with channels 94 on the latches 76. The ribs 92 are shown in more detail in a cross-sectional view of the piston 88a in FIG. 4A. Due to the inclined path of the ribs 92 and the channels 94, axial movement of primary locking piston 88 is translated into radial movement of the latches 76. As the primary locking piston 88 is moved downward, the interaction of the ribs 92 and the channels 94 cause the latches 76 to move inward to a position beneath the stab member flange 12a. The channels 94 can be better understood by referring to FIG. 4B which shows a side view of one of the latches 76, and referring to FIG. 4B which shows an end view of one of the latches 76. This locks the housing member 16 to the stab member 12 with sealed connections made up between the choke and kill lines and the blowout preventer stack. Once each of connectors 10 is locked in place, the weight and friction of the primary locking piston 88 keeps the latches 76 in a locked position without the need for continuous hydraulic pressure through the latching port 80.

Figure 6:
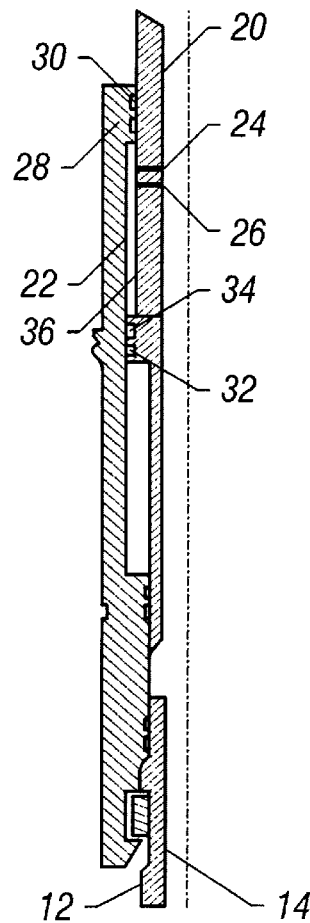
FIG. 6 is a schematic diagram illustrating the balancing of forces provided by the pressure balancing chamber in combination with the latching system.

FIG. 6 shows a schematic illustration of how the axial forces across the connection are balanced. One axial force develops from fluid pressure across the connection between the bore 24 of the central body 20 and the bore 14 of stab member 12. This force is substantially balanced by the other axial force which develops in annular pressure balancing chamber 36 from fluid pressure in the body that is communicated to the chamber via the pressure balancing ports 26 in the upper body. Force A is shown as the separation force between the central body 20 and the stab 12, which results from fluid pressure applied across bores 14, 24. This force acts on the ends of the central body 20 and the stab 12, as well as the lower body seals 71 and 73. Force B is the force that tends to move the main piston 22 upward relative to the central body 20. It results from fluid pressure transmitted from the central bore 24 through the pressure balancing ports 26 into the pressure balancing chamber 36. This acts on the piston interior ledge 28 and its seals 30 on the main piston 22 and the central body exterior ledge 32 and its seals 34.

As indicated in FIG. 6, the magnitude of force B is greater than the magnitude of force A because the area exposed to the bore pressure is greater in the pressure balancing chamber 36 than at the connection point with the stab 12. Force B that is applied to the main piston 22 is also applied to latches 76 via lower body 70 and primary locking piston 88. Force B is ultimately applied by the latches 76 to the flange of stab 12a as a latching force. Because of the combination of the latching system and the pressure balancing chamber, no separation forces from internal bore pressures are imparted to the BOP stack frame. In other words, the choke and kill line connections provided by the present invention are internally pressure balanced.

For unlocking from the BOP stack, the connector 10 is equipped with elbow connector 98 set in primary unlock port 100, which initiates upper unlock bore 102. The upper unlock bore 102 intersects the lower unlock bore 104, which fluidly connects the primary unlock port 100 to the primary unlock chamber 106. When hydraulic pressure is applied through the primary unlock port 100 via elbow 98 pressurizes the primary unlock chamber 106. This moves the primary locking piston 88 from its extended position to its retracted position. The retraction of the primary locking piston 88 induces latches 76 to move radially outwardly and out of engagement with the stab member 12. As a result, the housing member 16 is unlocked from the stab member 12 on the BOP stack frame. The unlocking port and pressure bores are shown positioned 90° clockwise out of position in FIGS. 3A and 3B for illustration purposes; the proper positioning is shown in FIGS. 7A–7C.

The secondary unlock port 108 is also provided for redundancy in case the primary unlock port 100 experiences a failure in its hydraulic line. As shown in FIG. 4, the secondary unlock port 108 communicates with the secondary unlock chamber 110 to provide pressurized fluid for inducing upward movement of the primary locking piston 88 to unlock the latches 76 from flange of stab member 12a.

The operation of the choke and kill line connectors 10 is summarized below with reference to FIGS. 7A–7C. When the lower marine riser package is lowered from the surface vessel and landed upon the BOP stack frame, the housing member 16 is in the retracted, unlocked position shown in FIG. 7A. At this point, the guide ring 112 is at least two inches above the top of stab member 12.

A two-step operation is conducted to lock the connector to the BOP stack frame. First, hydraulic pressure is applied to the extension port 46, which pressurizes the extension chamber 56 and move the main piston 22 to its extended position. As the piston is lowered, the tapered section of the lower body 70a guides the guide ring 112 over the upper end of the stab member 12 and its flange 12a. The main piston 22 is lowered until the tapered portion of lower body 70a engages the upper shoulder of the stab member flange 12a. At this time, the lower body seals 73 will have been brought into engagement with the upper cylindrical wall of the stab member 12. These seals cooperate with the lower body seals 71 to seal the connection across bores 24 and 14. This position is shown in FIG. 7B, which illustrates that the guide ring 112 is separated from lower section 88C of primary locking piston 88 which visually indicate an extended, but unlocked setting.

Next, hydraulic pressure is applied to the latching port 80, which energizes the latching chamber 86 and causes the primary locking piston 88 to move downward relative to the main piston 22 and its attached components. The action of the primary locking piston 88 forces the latches 76 to move radially inward beneath the flange 12a into locking engagement with the stab member 12. From this point, the pressurized fluid that is communicated through the central bore 24 will energize the pressure balancing chamber 36 via the pressure balancing ports 26. By the action of primary locking piston 88, the lower portion 88c of the primary locking piston is lowered upon the guide ring 112. It provides a visual indication that the connector has been set to a locked position as shown in FIG. 7C.

The force resulting from the pressurized fluid in the pressure balancing chamber 36 is translated to a force applied to the latches 76. This tends to pull the latch members upwardly against the flange 12a. The magnitude of this force, represented in FIG. 6 as force B, is greater than the magnitude of separation force A which tends to pull the housing member 16 from the stab member 12. The forces developed in the central bore 24 are absorbed through the locked, sealed connection that is provided by the connector 10 on the choke and kill line.

When the lower marine riser package must be disconnected from the BOP stack, the connector 10 must first be unlocked. This action is performed by applying hydraulic pressure to the primary unlock port 100 via the elbow connector 98 to energize the primary unlocking chamber 106. Pressure in the chamber 106 applies a force to the primary locking piston 88 which forces it to move upward. This causes the latches 76 to be radially withdrawn from stab member 12. The action of the primary locking piston 88 lifts the lower portion 88c from the guide ring 112 to resume the position shown in FIG. 7B. Alternatively, hydraulic pressure may be applied to the secondary unlock port 108 to induce the unlocking action of the connector 10 if the primary unlock port 100 should fail.

Once the connector 10 is unlocked, hydraulic pressure is applied to the retraction port 48 to retract the main piston 22, along with the lower body 70 and the primary locking piston 88. This action returns the connector 10 to the position shown in FIG. 7A.

Because many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for coupling a fluid line to a stab member, comprising:

an inner housing having a fluid passage therethrough and a body slidably disposed on an exterior thereof, said body extensible from and retractable into said inner housing on application of fluid pressure to chambers formed between said body and an outer housing, said body having at one end a sealed coupling for sealably coupling a fluid passage in said stab member to said fluid passage in said inner housing;

a piston slidably disposed on said one end of said body and extensible from and retractable towards said body on application of fluid pressure to fluid chambers formed between said body and said piston, said piston having an inner surface adapted to cause radial compression of latches when said piston is extended from said body, said latches when compressed engaging a mating surface on an end of said stab member to substantially prevent axial separation between said inner housing and said stab member; and a fluid chamber between said body and said inner housing in fluid communication with said passage in said inner housing arranged so that fluid pressure in said fluid passage generates retracting force on said body with respect to said inner housing.

2. The apparatus as defined in claim 1 wherein said chamber between said body and said inner housing defines an active area against said body whereby said retracting force on said body resulting from said fluid pressure in said fluid passage exceeds an axial separating force caused by said fluid pressure in said passage in said inner housing and said stab member.

3. The apparatus as defined in claim 1 wherein said fluid line comprises a choke and kill line.

4. The apparatus as defined in claim 1 wherein:

said inner housing and said outer housing are each coupled to a flange at one end, and said body is disposed between said inner housing and said outer housing, said body including seals between an inner surface thereof and an outer surface of said inner hosing to form said fluid chamber, said body including seals between an outer surface thereof and an inner surface of said outer housing to form said chambers.

5. A method for coupling a fluid line to a stab member, comprising:

positioning an inner housing proximal to said stab member, said inner housing and said stab member each having a fluid passage therethrough;

pressurizing a chamber formed between a body slidably disposed outside said inner housing and an outer housing so as to extend said body from said inner housing and to cause said body to sealingly engage said stab member;

pressurizing a chamber formed between said body and a piston disposed on an end of said body so as to extend said piston therefrom and radially compress latches disposed on an end of said inner housing, said latches when compressed engaging a mating surface on said stab member so as to substantially prevent axial separation between said stab member and said inner housing; and pressurizing said passages in said stab member, said inner housing and a chamber formed between said inner housing and said body so as to generate force retracting said body into said inner housing, whereby force separating said stab member and said inner housing is counteracted by said retracting force.

6. The method as defined in claim 5 wherein said retracting force is greater than said separating force.

* * * * *